(12) United States Patent
Jeon et al.

(10) Patent No.: US 8,493,949 B2
(45) Date of Patent: Jul. 23, 2013

(54) METHOD OF EXCHANGING MESSAGE AND DEVICES IN WIRELESS NETWORK

(75) Inventors: Beom Jin Jeon, Seoul (KR); Joong Heon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 12/897,737

(22) Filed: Oct. 4, 2010

(65) Prior Publication Data

US 2011/0019646 A1   Jan. 27, 2011

Related U.S. Application Data

(63) Continuation of application No. 12/712,155, filed on Feb. 24, 2010.

(60) Provisional application No. 61/155,502, filed on Feb. 25, 2009.

(30) Foreign Application Priority Data

Nov. 20, 2009   (KR) .................. 10-2009-0112637

(51) Int. Cl.
*H04W 4/00* (2009.01)
*H04W 84/18* (2009.01)
*H04W 84/12* (2009.01)

(52) U.S. Cl.
CPC .............. *H04W 84/18* (2013.01); *H04W 84/12* (2013.01)
USPC .......................................... 370/338; 455/434

(58) Field of Classification Search
USPC ..................... 370/331, 338; 455/434
See application file for complete search history.

(56) References Cited

U.S. PATENT DOCUMENTS

| 2002/0057787 | A1* | 5/2002 | Yi .................................. | 379/230 |
|---|---|---|---|---|
| 2003/0224787 | A1* | 12/2003 | Gandolfo ....................... | 455/434 |
| 2005/0170852 | A1 | 8/2005 | Li et al. | |
| 2005/0249167 | A1 | 11/2005 | Salokannel | |
| 2006/0165024 | A1* | 7/2006 | Iwami et al. ................... | 370/315 |
| 2007/0025384 | A1 | 2/2007 | Ayyagari et al. | |
| 2007/0026880 | A1* | 2/2007 | Doi et al. ....................... | 455/502 |
| 2007/0047510 | A1 | 3/2007 | Cho et al. | |
| 2008/0019347 | A1* | 1/2008 | Shin et al. ...................... | 370/345 |
| 2008/0129880 | A1 | 6/2008 | Shao et al. | |
| 2009/0046653 | A1 | 2/2009 | Singh et al. | |

FOREIGN PATENT DOCUMENTS

| JP | 2002-142248 | 5/2002 |
|---|---|---|
| KR | 1020040055244 | 6/2004 |
| KR | 1020070052209 | 5/2007 |

OTHER PUBLICATIONS

IEEE Standard, "Part 15.3: Wireless Medium Access Control (MAC) and Physical Layer (PHY) Specifications for High Rate Wireless Personal Area Networks (WPANs)," Sep. 2003, XP-002599968.

* cited by examiner

*Primary Examiner* — Pao Sinkantarakorn
*Assistant Examiner* — Richard K Chang
(74) *Attorney, Agent, or Firm* — Lee, Hong, Degerman, Kang & Waimey

(57) ABSTRACT

A method of exchanging messages at a device in a wireless network comprises transmitting a change request message for requesting a change of a beacon position among configuration parameters of the wireless network to a coordinator; and receiving a response message in response to the request message from the coordinator.

10 Claims, 18 Drawing Sheets

FIG. 12

| Octets : 1 | 1 | 2 |
|---|---|---|
| Command ID | Length | Reason Code |

| Octets : 3 | 1 | 1 | 2 | 2 |
|---|---|---|---|---|
| IE index | Length | Change type | Change beacon number | WVAN parameter |

900  901  902  903  904

FIG.14
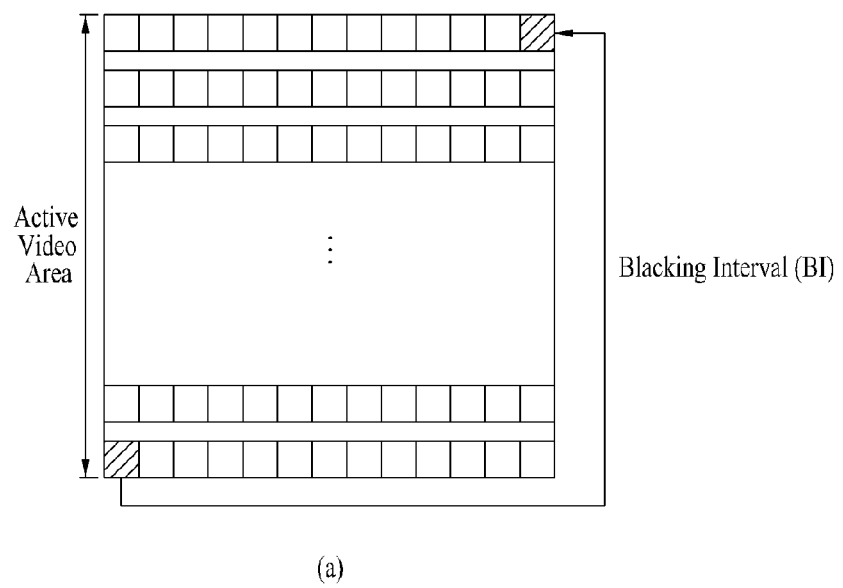
(a)
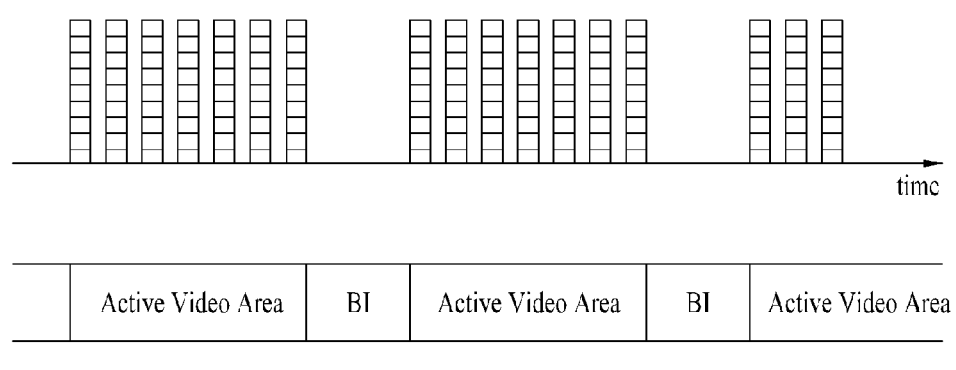
(b)

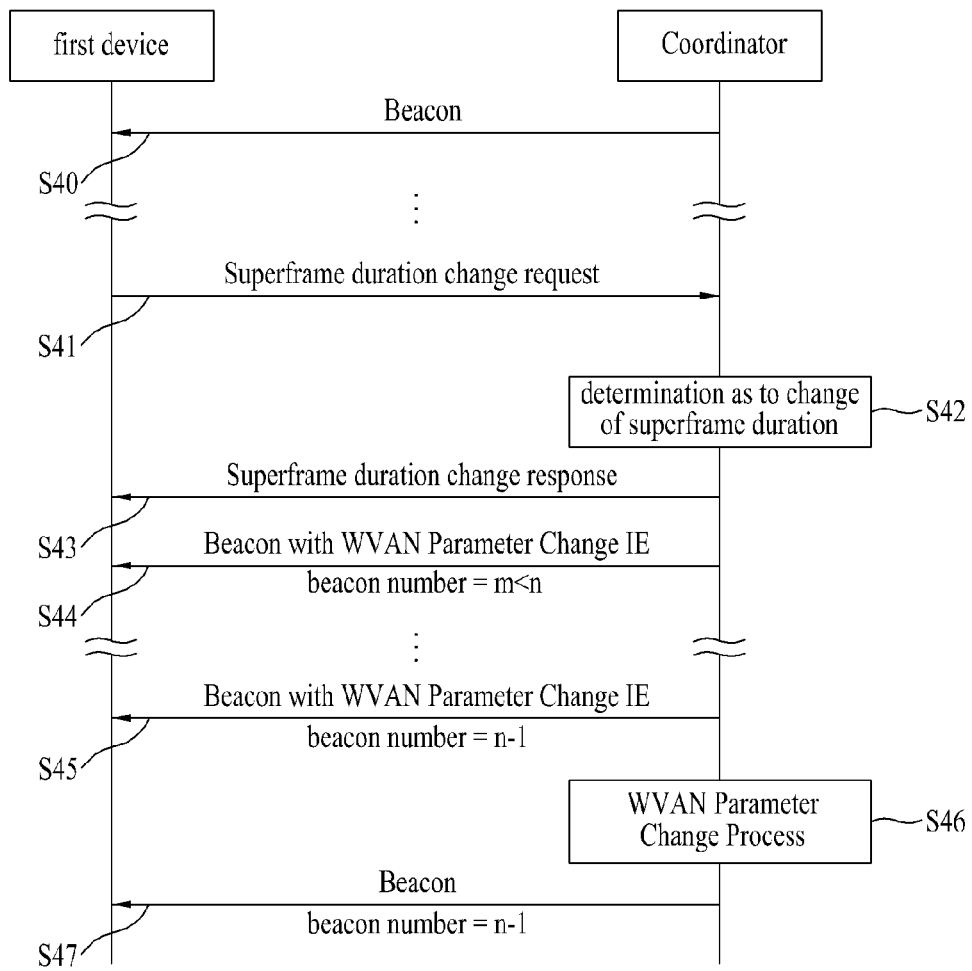

METHOD OF EXCHANGING MESSAGE AND DEVICES IN WIRELESS NETWORK

This application is a continuation of U.S. application Ser. No. 12/712,155, filed on Feb. 24, 2010, currently pending, which claims the benefit and right of priority to U.S. Provisional Application No. 61/155,502, filed on Feb. 25, 2009, and which also claims the benefit of earlier filing date and right of priority to Korean Patent Application No. 10-2009-0112637, filed on Nov. 20, 2009, the contents of which are all hereby incorporated by reference herein in their entirety.

BACKGROUND OF THE INVENTION

1. Field of the Invention

The present invention relates to a wireless network, and more particularly, to a method of exchanging messages between devices belonging to a wireless network and the devices.

2. Discussion of the Related Art

Recently, Bluetooth and wireless personal area network (WPAN) technologies have been developed, which form a wireless network between a relatively small number of digital devices in limited places such as homes or small companies to allow audio or video data to be exchanged between the devices. The WPAN can be used for information exchange between a relatively small number of digital devices in a relatively close distance, and enables low power and low-cost communication between the digital devices. IEEE 802.15.3 (Wireless Medium Access Control (MAC) and Physical Layer (PHY) Specifications for High Rate Wireless Personal Area Networks (WPANs)) approved on Jun. 12, 2003 defines specification of a MAC layer and a physical (PHY) layer of high rate WPAN.

FIG. 1 is a brief diagram illustrating an example of a wireless private access network (WPAN). As illustrated in FIG. 1, the WVAN is a network configured between personal devices within a limited space such as home, and allows information to be exchanged between applications without seamlessness by configuring a network through direct communication between devices. Referring to FIG. 1, the WPAN includes two or more user devices 11 to 15, one of which acts as a coordinator 11. The coordinator 11 provides basic timing of the WPAN and serves to control quality of service (QoS) requirements. Examples of the user devices include computers, PDAs, notebook computers, digital TVs, camcorders, digital cameras, printers, mikes, speakers, headsets, bar-code readers, displays, and cellular phones. All digital devices can be used as the user devices.

The WPAN is not predesigned but is an ad hoc network (hereinafter, referred to as 'piconet') formed if necessary without assistance of a central infrastructure. A procedure of forming one piconet will be described in detail. The piconet starts as a random device that can be operated as a coordinator performs the function of the coordinator. All devices perform scanning before associating with the existing piconet or starting a new piconet. Scanning means that a device collects and stores information of channels and searches whether the existing piconet exists. A device that has been commanded from an upper layer to start a piconet forms a new piconet without associating with a piconet previously formed on a random channel. The device starts a piconet by selecting a channel having little interference based on data acquired during scanning and broadcasting a beacon through the selected channel. In this case, the beacon means timing allocation information, information of other devices within a piconet, and control information broadcasted by the coordinator to control and manage the piconet.

FIG. 2 is a diagram illustrating an example of a superframe used in a piconet. Timing control in the piconet is basically performed based on superframes. Referring to FIG. 2, each superframe starts by means of the beacon transmitted from the coordinator. A contention access period (CAP) is used to allow devices to transmit commands or asynchronous data based on contention. A channel time allocation period includes a management channel time block (MCTB) and a channel time block (CTB). The MCTB is a period where control information can be transmitted between a coordinator and a device or between devices. The CTB is a period where asynchronous data or isochronous data can be transmitted between a device and a coordinator or between other devices. For each superframe, the number, length and location of CAPs, MCTBs, and CTBs are determined by the coordinator and transmitted to other devices within the piconet through the beacon.

When a random device within the piconet needs to transmit data to the coordinator or other device, the device requests the coordinator to allocate channel resources for data transmission, and the coordinator allocates the channel resources to the device within the range of available channel resources. If the CAP exists within the superframe and the coordinator accepts data transmission in the CAP, the device can transmit data of small capacity through the CAP without being allocated with channel time from the coordinator.

If the number of devices within the piconet is small, since channel resources for data transmission from each device are sufficient, no problem occurs in allocation of channel resources. However, if channel resources are insufficient due to a large number of devices, or if data of large capacity such as moving pictures are transmitted, a problem may occur in that channel resources are not allocated to the other devices even though the other devices have data to be transmitted, whereby communication cannot be performed.

Even though the channel resources are allocated, since management and control of the WVAN is performed by the coordinator, communication quality may be deteriorated depending on the status of one or more devices that belong to the WVAN.

In this respect, various methods for efficiently performing data communication between devices constituting WVAN without any problem are being studied.

SUMMARY OF THE INVENTION

On a WVAN, a coordinator provides basic timing of the WPAN including start and end of the WVAN, and performs management and control of the WVAN including control of quality of service (QoS) requirements.

Also, the coordinator randomly determines whether to change a WVAN configuration parameter and reports the changed result to one or more devices that belong to the WVAN. For example, the devices of the WVAN may have different lengths of video data output intervals depending on device configuration and setup statuses. If WVAN timing is not synchronized with video data output timing, wherein the WVAN timing and the video data output timing are controlled by the coordinator, the number of times of buffering and the time required for buffering increase during an output procedure. Buffering is to buffer the difference in processing speed by temporarily storing information to smoothly transmit and receive data.

Accordingly, the present invention is directed to a method of exchanging messages between devices belonging to a wireless network and the devices, which substantially obviate ones or more problems due to limitations and disadvantages of the related art.

An object of the present invention is to provide a method of exchanging WVAN parameter change messages between a device and a coordinator if a WVAN device decides to need change of a WVAN configuration parameter.

Another object of the present invention is to provide a method of transmitting a WVAN parameter change request message from a device to a coordinator and changing a WVAN parameter in accordance with the request message of the device. Specifically, if a random device transmits a request message to a coordinator by designating a desired one of WVAN parameters and change matters in accordance with its status, the coordinator determines whether to change the WVAN parameter and performs change of the WVAN parameter.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of exchanging messages at a device in a wireless network comprises transmitting a change request message for requesting a change of a beacon position among configuration parameters of the wireless network to a coordinator; and receiving a response message from the coordinator in response to the request message.

Preferably, the request message comprises a command ID field comprising a unique number that identifies the request message, a length field indicating a length of the request message and a beacon position change field indicating an offset from an original beacon position to a requested new beacon position.

More preferably, the response message comprises a command ID field comprising a unique number that identifies the response message, a length field indicating a length of the response message and a reason code field comprising a reason code.

If the reason code field comprises the reason code of "SUCCESS", the method according to the embodiment of the present invention further comprises receiving a plurality of beacons from the coordinator, each of the plurality of beacons comprises a parameter change information element (IE) including a changed beacon position.

More preferably, the parameter change IE comprises a IE index field comprising a unique number that identifies the parameter change IE, a change type field indicating a type of the parameter to be changed, a change beacon number field comprising a beacon number of a superfame when the change of the parameter takes effect and a network parameter field comprising information about a changed value of the parameter.

According to the embodiment of the present invention, the information about the changed value of the parameter is an offset between expected beacon transmission time and time when a beacon will be transmitted after the change of the beacon position. And, a last beacon among the plurality of beacons is broadcasted by the coordinator right before a beacon corresponding to the beacon number is broadcasted.

The method according to the embodiment of the present invention further comprises receiving a beacon to which the changed beacon position is applied, from the coordinator.

According to the embodiment of the present invention, if the change of the beacon position is not possible, the reason code field comprises a reason for failure.

According to the embodiment of the present invention, the reason for failure is any one of "Unsupported Feature", "Already synchronized with higher priority stream", "Network shutdown in progress", "Channel change in progress", "Coordinator handover in progress" and "Other failure".

Each of the change request message and the response message are included in a media access control (MAC) packet.

In another aspect of the present invention, a device of a wireless network comprises a transmitting module, a receiving module and a network control module generating a change request message for requesting a change of a beacon position among configuration parameters of the wireless network and transmitting the change request message to a coordinator through the transmitting module, wherein the receiving module receives a response message from the coordinator in response to the request message.

Preferably, the response message comprises a command ID field comprising a unique number that identifies the response message, a length field indicating a length of the response message and a reason code field comprising a reason code.

If the reason code field comprises the reason code of "SUCCESS", the device receives a plurality of beacons through the receiving module from the coordinator, each of the plurality of beacons comprises a parameter change information element (IE) including a changed beacon position.

The device according to the embodiment of the present invention receives a beacon to which the changed beacon position is applied, through the receiving module from the coordinator In another aspect of the present invention, a method of exchanging messages at a coordinator in a wireless network comprises receiving a change request message for requesting a change of a superframe duration length among configuration parameters of the wireless network from a random device belonging to the wireless network and transmitting a response message to the device in response to the request message.

In another aspect of the present invention, a coordinator of a wireless network comprises a transmitting module, a receiving module receiving a change request message for requesting a change of a beacon position among configuration parameters of the wireless network from a random device of the wireless network and a network control module generating a response message in response to the request message and transmitting the response message to the device through the transmitting module.

According to the embodiment of the present invention, on the WVAN, the device requests the coordinator to change the WVAN parameter in accordance with its data output status, whereby efficiency of data communication can be enhanced more actively.

Specifically, as the device performs the change request of at least one of a beacon position and a superframe interval to control WVAN timing in accordance with its status, the number of times of buffering and the time required for buffering can be minimized during a data output procedure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 is a diagram illustrating another example of a data format that includes a MAC command according to one embodiment of the present invention;

FIG. 13 is a diagram illustrating an example of a data packet that includes WVAN configuration information in accordance with one embodiment of the present invention;

FIG. 14 is a diagram illustrating an example of a video data output procedure according to one embodiment of the present invention;

FIG. 17 is a flow chart illustrating another example of a procedure of exchanging messages for WVAN parameter change in accordance with one embodiment of the present invention;

FIG. 18 is a diagram illustrating other example of a MAC command format according to one embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be understood readily by the preferred embodiments of the present invention, examples of which are illustrated in the accompanying drawings. Embodiments described later are examples in which technical features of the present invention are applied to a wireless video area network (WVAN) which is a kind of a WPAN.

Figure 1:
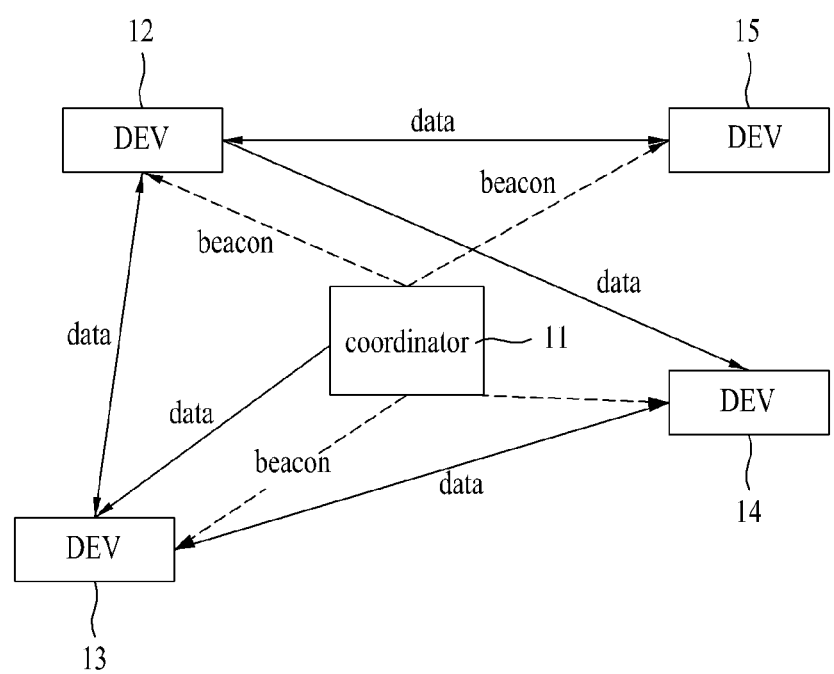
FIG. 1 is a diagram illustrating an example of a WPAN.
Figure 2:
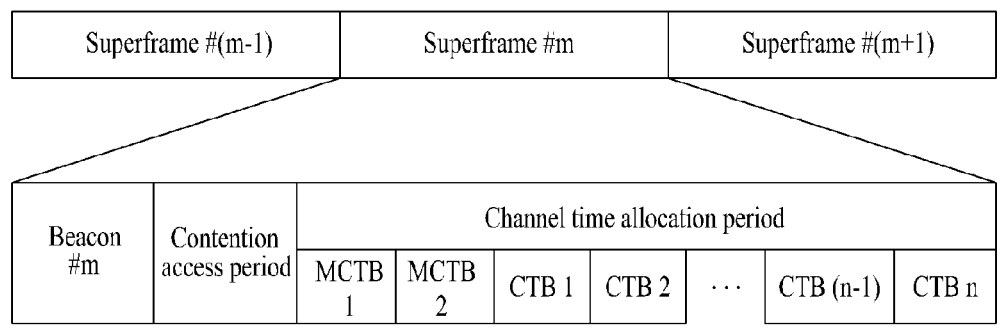
FIG. 2 is a diagram illustrating an example of a superframe used in a piconet.
Figure 3:
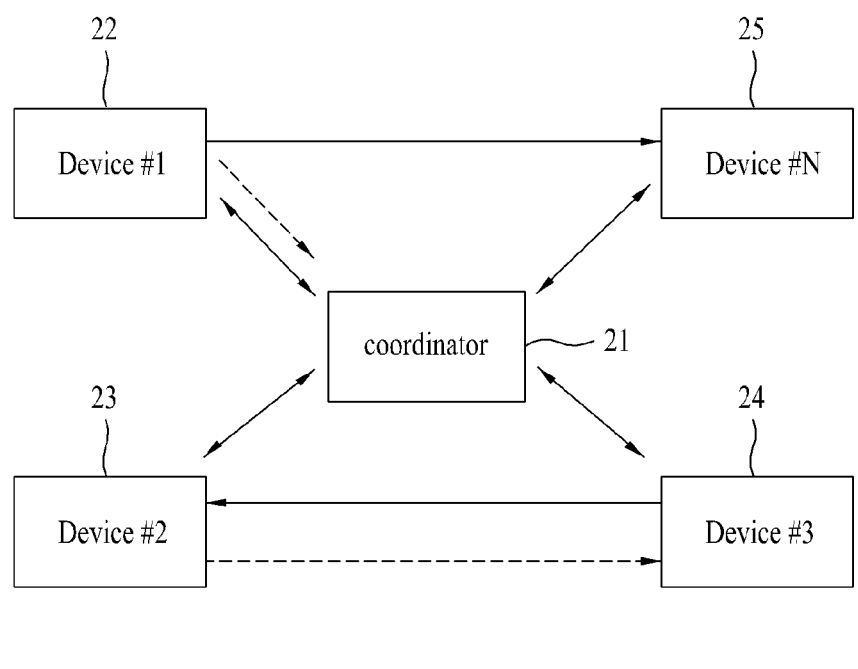
FIG. 3 is a diagram illustrating an example of a WVAN.

FIG. 3 is a diagram illustrating an example of a WVAN. In the same manner as illustrated in FIG. 1, a WVAN of FIG. 3 includes two or more user devices 22 to 25, one of which acts as a coordinator 21. The coordinator 21 provides basic timing of the WVAN, maintains a track of devices belonging to the WVAN, and serves to control quality of service (QoS) requirements. The coordinator performs its function and at the same time serves as one device belonging to the WVAN. Other devices 22 to 25 different from the coordinator 21 can start stream connection.

One of the differences between the WVAN illustrated in FIG. 3 and the WPAN of FIG. 1 is that the WVAN of FIG. 3 supports two kinds of physical (PHY) layers. Namely, the WVAN supports physical layers, high-rate physical (HRP) layer and low-rate physical (LRP) layer. The HRP layer is a physical layer that can support a data transmission rate of 1 Gb/s or greater, and the LRP layer is a physical layer that supports a data transmission rate of several Mb/s. The HRP layer is highly directional, and is used for transmission of isochronous data streams, asynchronous data, MAC command and A/V control data through unicast connection. The LRP layer supports a directional or omni-directional mode and is used for transmission of beacon, asynchronous data, and MAC command through unitcast or broadcasting. The coordinator 21 can transmit or receive data to and from other device using the HRP and/or LRP layer. The other devices 22 to 25 of the WVAN can also transmit or receive data using the HRP and/or LRP layer.

Figure 4:
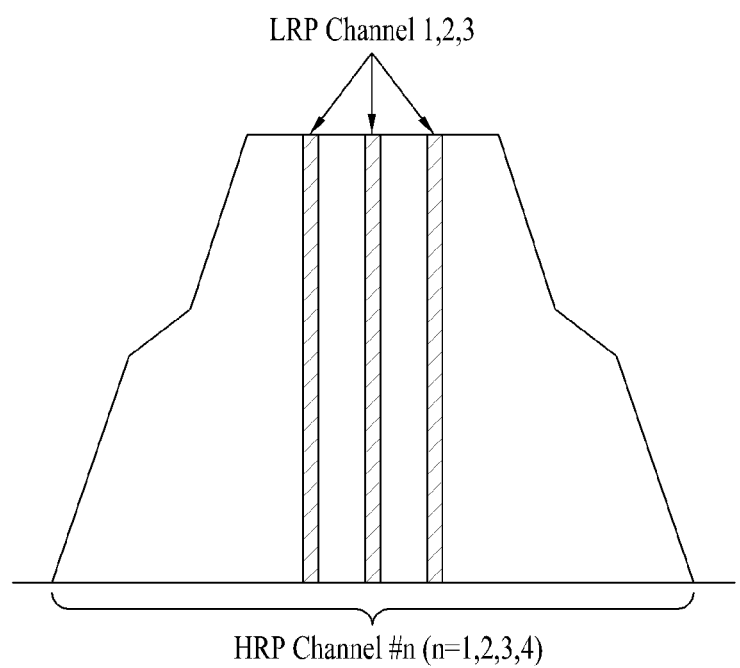
FIG. 4 is a diagram illustrating a frequency band of HRP channels and LRP channels used in a WVAN.

FIG. 4 is a diagram illustrating a frequency band of HRP channels and LRP channels used in a WVAN. The HRP layer uses four channels of a bandwidth of 2.0 GHz in a band of 57 to 66 GHz, and the LRP layer uses three channels of a bandwidth of 92 MHz. As illustrated in FIG. 4, the HRP channels and the LRP channels share a frequency band and are used respectively by a TDMA mode.

Figure 5:
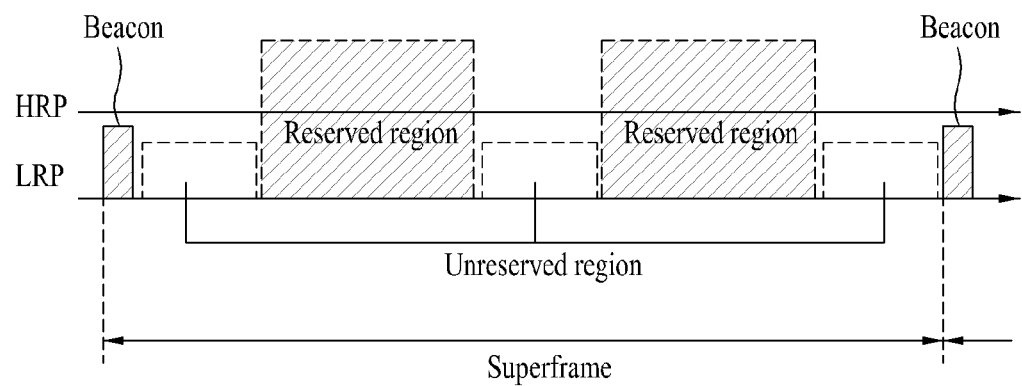
FIG. 5 is a diagram illustrating an example of a structure of a superframe used in a WVAN.

FIG. 5 is a diagram illustrating an example of a structure of a superframe used in a WVAN. Referring to FIG. 5, each superframe includes a beacon region where a beacon is transmitted, a reserved region allocated to a random device by the coordinator in accordance with a request of the devices, and an unreserved region not allocated by the coordinator but transmitting and receiving data between the coordinator and device or between devices in accordance with a contention based mode, wherein each of the regions is time divided. The beacon includes timing allocation information in a corresponding superframe, and management and control information of the WVAN. The reserved region is used to transmit data from a device, to which channel time is allocated by the coordinator in accordance with a channel time allocation request of the device, to other device. Command, data streams, asynchronous data, etc. can be transmitted through the reserved region. If a specific device transmits data to other device through the reserved region, the HRP channel is used. If the device that receives the data transmits ACK/NACK signal of the received data, the LRP channel is used. The unreserved region can be used to transmit control information, MAC command, or asynchronous data between the coordinator and the device or between the devices. In order to prevent data collision between the devices in the unreserved region, a carrier sense multiple access (CSMA) mode or a slotted Aloha mode can be used. In the unreserved region, the data can be transmitted through the LRP channel only. If there are many kinds of control information or commands to be transmitted, the reserved region can be set in the LRP channel. In each superframe, the length and the number of reserved regions and unreserved regions can be varied per superframe and are controlled by the coordinator.

Figure 6:
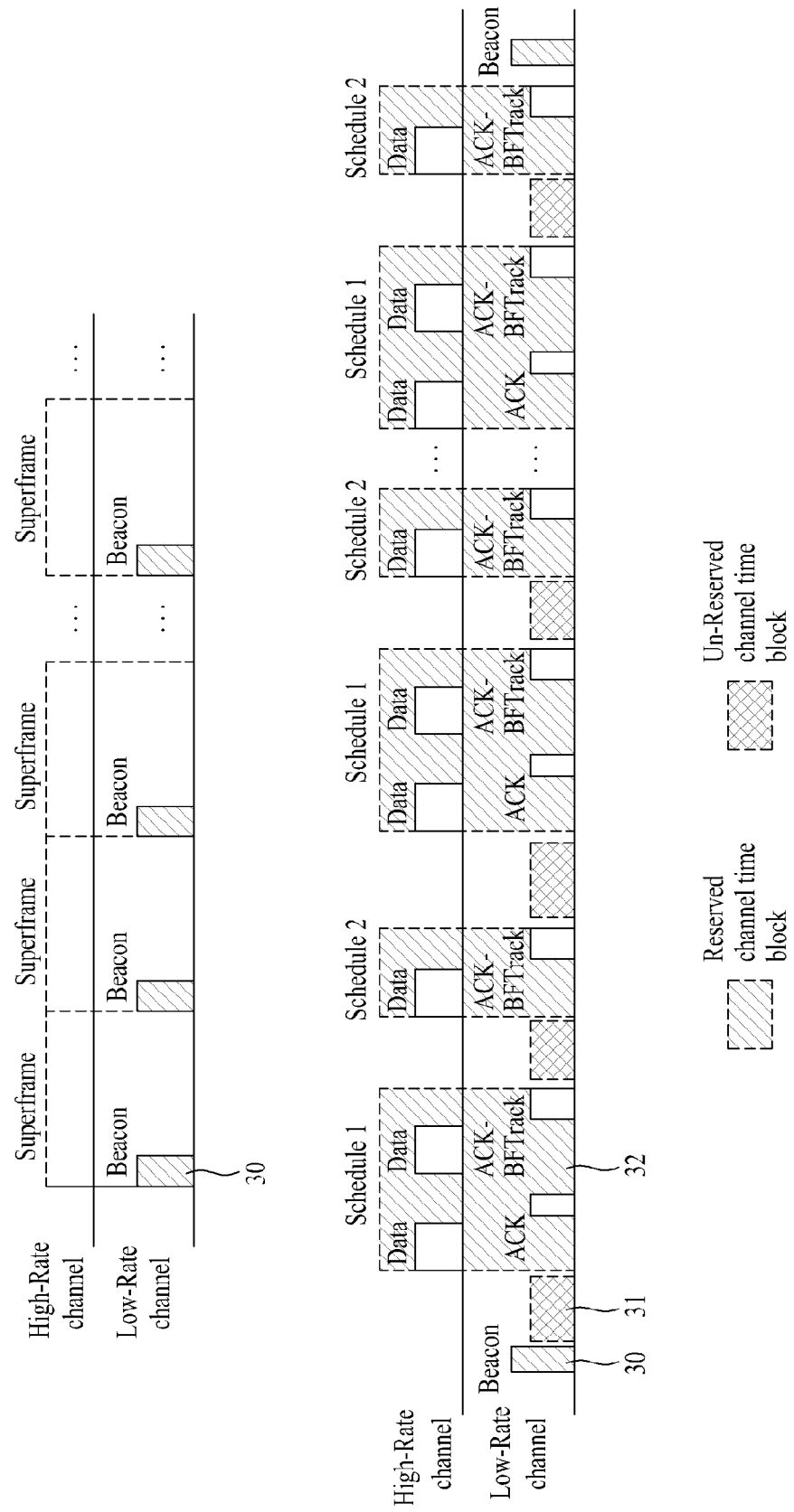
FIG. 6 is a diagram illustrating another example of a structure of a superframe used in a WVAN.

FIG. 6 is a diagram illustrating another example of a structure of a superframe used in a WVAN. Referring to FIG. 6, each superframe includes a beacon field 30 where a beacon is transmitted, a reserved channel time block 32, and an unreserved channel time block 31. Each of the channel time blocks (CTB) is time-divided into a HRP region to which data are transmitted through the HRP layer and a LRP region to which data are transmitted through the LRP layer. The beacon 30 is periodically transmitted by the coordinator to identify a beginning part of each superframe, and includes scheduled timing information and management and control information of the WVAN. The device can exchange data in the network through the timing information and management/control information included in the beacon.

In the HRP region, the reserved CTB field can be used to transmit data from a device, to which channel time is allocated by the coordinator in accordance with a channel time allocation request of the device, to other device. If a specific device transmits data to other device through the reserved CTB field, the HRP channel is used. If the device that receives the data transmits ACK/NACK signal of the received data, the LRP channel is used.

The unreserved CTB field can be used to transmit control information, MAC command, or asynchronous data between the coordinator and the device or between the devices. In order to prevent data collision between the devices in the unreserved CTB field, a carrier sense multiple access (CSMA) mode or a slotted Aloha mode can be used. If there are many kinds of control information or commands to be transmitted, the reserved region can be set in the LRP channel. In each superframe, the length and the number of reserved CTB fields and unreserved CTB fields can be varied per superframe and are controlled by the coordinator.

Furthermore, although not shown in FIG. 6, each superframe includes a contention-based control period (CBCP) located next to the beacon to transmit urgent control/management messages. The length of the CBCP is set so as not to exceed a given threshold value mMAXCBCPLen.

Figure 7:
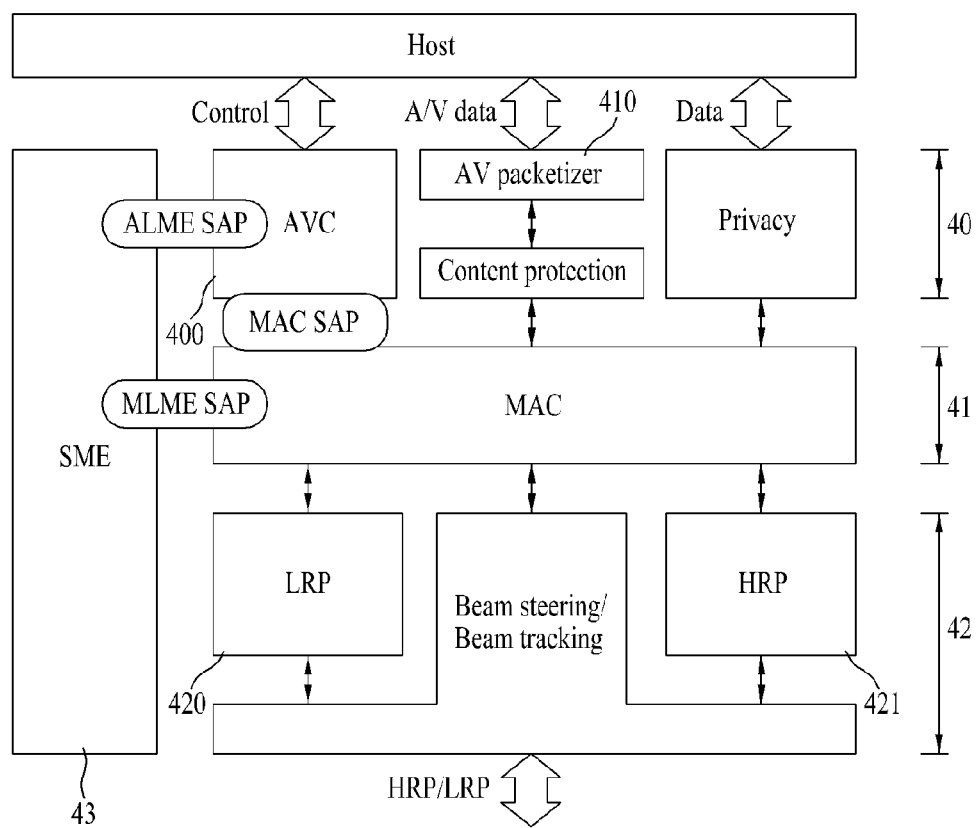
FIG. 7 is a diagram illustrating a protocol layer structure implemented in a device of a WVAN.

FIG. 7 is a diagram illustrating a protocol layer structure implemented in a device of a WVAN.

Referring to FIG. 7, a communication module of each device included in the WVAN can include four layers depending on its function. Generally, the communication module includes an adaptation sublayer 40, a MAC layer 41, a PHY layer 42, and a station management entity (SME) layer 43. In this case, a station is a device for identifying the coordinator, and the station management entity (SME) means a device management entity (DME). The station management entity (SME) is a layer independent entity that controls a lower layer and collects status information of device from each layer. The station management entity SME includes entities that manage each layer of the communication module. In this case, an entity that manages the MAC layer will be referred to as a MAC layer management entity (MLME), and an entity that manages the adaptation layer will be referred to as an adaptation layer management entity (ALME).

The adaptation sublayer 40 includes an AVC protocol 400 and an A/V packetizer 410. The AVC protocol 400 is an upper layer that performs device control and streaming connection for A/V data transmission between a transmitting device and a receiving device. The A/V packetizer 410 formats A/V data for HRP data service.

The MAC layer 41 takes the role in link setup, connection or non-connection, and channel access to a lower layer of a material transmission protocol, and also takes the role in reliable data transmission. In other words, the MAC layer 41 serves to transmit a control/data message or control a channel.

The PHY layer 42 directly processes A/V data, or the A/V data may be processed simultaneously by the PHY layer 42 and the MAC layer 31. The PHY layer is responsible for the task to convert a message requested from the upper layers such as the adaptation layer 30 and the MAC layer 41, so that the message can be sent and received between devices by the PHY layer. Also, the PHY Layer includes the aforementioned two kinds of physical layers, HRP layer 420 and LRP layer 421.

The layers of the device provide services such as a high rate service, a low rate service, and a management service. The high rate service is used for video, audio and data transfer, and the low rate service is used for transmission of audio data, MAC command, and asynchronous data of small capacity. The respective layers transmit and receive a simple message to and from each other before a process of data exchange is performed between the respective layers. The message exchanged between such different layers is referred to as primitive.

Generally, one WVAN includes two or more devices through a specific HRP channel and a specific LRP channel, wherein a random one of the two or more devices acts as a coordinator.

In order to start the WVAN, the coordinator selects a channel having a minimum interference ratio for the WVAN through a channel search procedure. The coordinator may request other WVAN devices to estimate a candidate channel or may perform channel estimation by itself. Since the wireless network uses the HRP channel and the LRP channel, it performs channel estimation for at least one of the two channels.

An example of a channel estimation method will be described with reference to FIG. 8.

Figure 8:
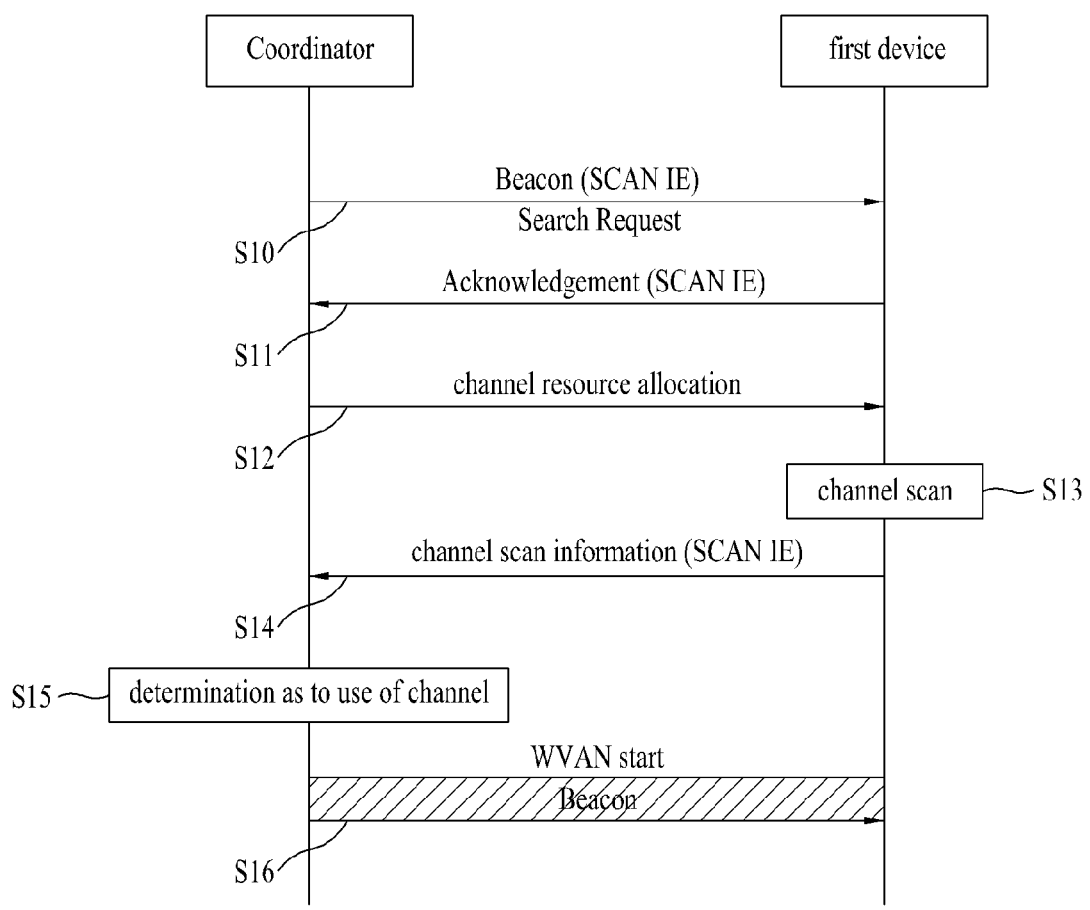
FIG. 8 is a flow chart illustrating an example of a procedure of estimating a channel in a wireless network according to the present invention.

FIG. 8 is a flow chart illustrating an example of a channel scan procedure for channel estimation in a wireless network according to the present invention. The WVAN includes a coordinator and one or more devices through a specific channel. However, for convenience of description, the other devices excluding the first device will not be shown in the following embodiment including the embodiment of FIG. 8.

Referring to FIG. 8, the coordinator transmits a channel scan request message to devices belonging to the wireless network so as to estimate a specific channel (S10). At this time, the request message for channel estimation can be included in the beacon, wherein the beacon is broadcasted by the coordinator to all devices on the network. Accordingly, as the beacon that includes an information element (IE) 'SCAN IE' for requesting channel estimation is transmitted, channel estimation can be requested to all devices within the network.

The device which has received the request message transmits a response message for the request for channel estimation to the coordinator to notify the coordinator whether to perform channel estimation (S11). The response message may also include the 'SCAN IE'. Since all devices within the wireless network cannot perform channel estimation, it is preferable that each device which has received the beacon notifies the coordinator as to whether it can perform channel estimation.

If the first device transmits the response message for the request for channel estimation to the coordinator, the coordinator allocates a time period, i.e., channel time block (CTB) for channel estimation (S12). The first device performs channel estimation by measuring an energy level, a noise level or an interference level on a specific channel for estimation for the allocated CTB (S13). Parameters that can estimate the channel status are not limited to energy, noise and interference levels on the channel. For example, the first device can use a bit error rate (BER) or a frame error rate (FER) measured during data reception as a parameter that can estimate the channel status.

The first device transmits channel estimation information to the coordinator after finishing channel estimation for the allocated CTB (S14). The coordinator determines whether quality of the specific channel is sufficient to start the WVAN, through the received channel estimation information (S15). The coordinator which has decided to start the WVAN using the corresponding channel starts to broadcast the beacon for the superframe used in the WVAN (S16). The beacon includes timing allocation information in the corresponding superframe, channel information, and management and control information of the WVAN. As the beacon is received, the devices belonging to the wireless network can identify that the WVAN has been started.

If the WVAN is generated, the coordinator additionally allocates device station identifier (STID) to perform data exchange with other devices that desire to join the generated WVAN.

As described above, if the WVAN starts, a coordinator and one or more devices, which belong to the WVAN, can directly perform data exchange, and the coordinator transmits information of the WVAN parameter to the one or more devices through the beacon. The WVAN parameter includes a WVNID parameter indicating identifier of a wireless network randomly selected by the coordinator as the WVAN starts, a beacon position parameter indicating the position where the beacon is transmitted, a superframe duration parameter indicating a duration length of a superframe constituting channel resources allocated from the coordinator to the one or more devices, and a channel index parameter used in the WVAN.

The coordinator may randomly change configuration matters of the WVAN parameter if necessary, or may change the WVAN parameter in accordance with a request of the device according to one embodiment of the present invention.

Figure 9:
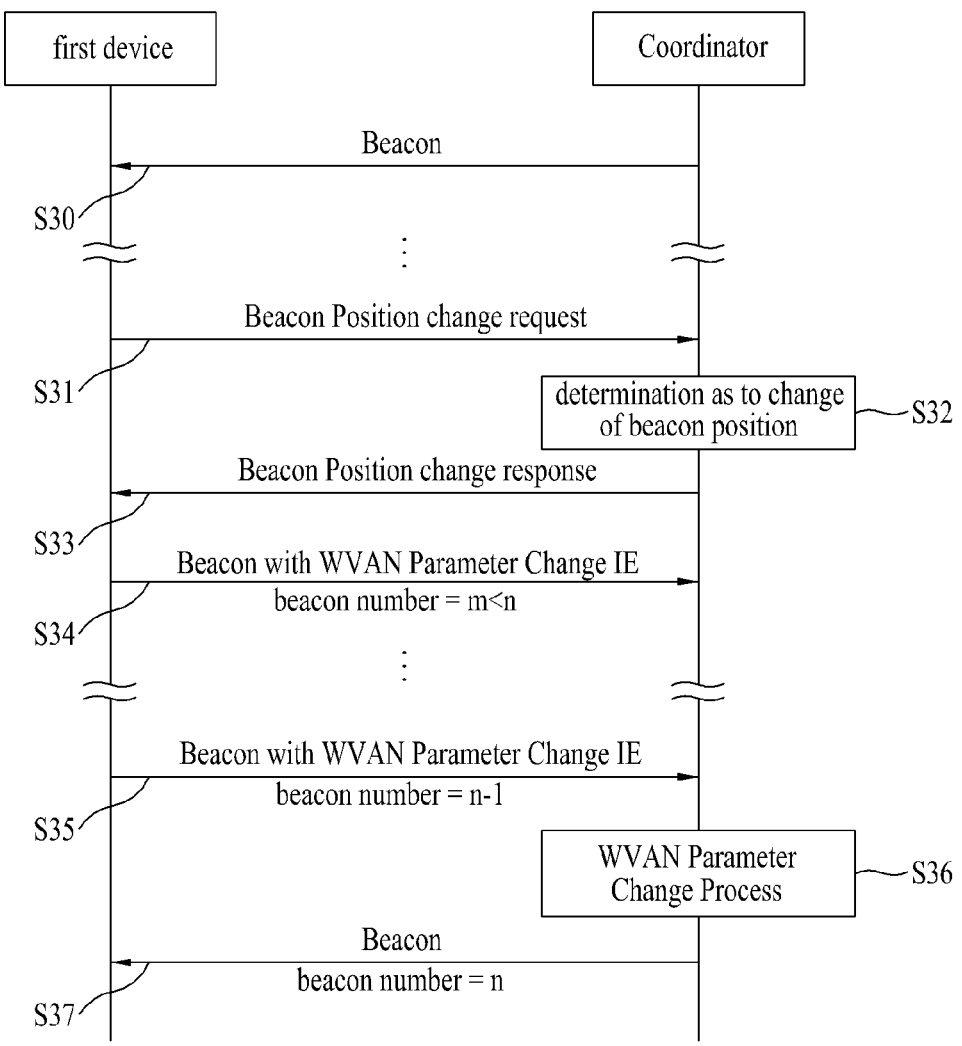
FIG. 9 is a flow chart illustrating an example of a procedure of exchanging messages for WVAN parameter change in accordance with one embodiment of the present invention.

FIG. 9 is a flow chart illustrating an example of a procedure of exchanging messages for WVAN parameter change in accordance with one embodiment of the present invention. In FIG. 9, for WVAN timing control, the device requests the coordinator to change the WVAN parameter of the beacon position.

Referring to FIG. 9, as the WVAN starts, the coordinator periodically transmits the beacon one or more devices belonging to the WVAN (S30). As described above, the beacon is a signal for identifying a beginning part of a superframe used by each device. Also, since each device transmits and receives data using one or more superframes, the coordinator periodically broadcasts the beacon.

The first device of the one or more devices transmits a beacon position change request message to the coordinator to request the position change on a time axis of the beacon transmitted from the coordinator in accordance with its status (S31). The coordinator determines whether to change the beacon position in accordance with the request of the first device (S32). And, the coordinator transmits a beacon position change response message to the first device, wherein the beacon position change response message includes the result determined for the beacon position change request (S33).

If the coordinator decides to change the position on the time axis of the beacon in accordance with the request of the first device, it transmits a new beacon to the device, wherein the beacon includes WVAN configuration information. The WVAN configuration information includes a WVAN parameter change IE. The coordinator transmits the WVAN configuration information changed at least one time to the devices belonging to the wireless network through the beacon (S34 and S35). For example, if the coordinator intends to apply the changed WVAN configuration information starting from the nth beacon transmission, it transmits the WVAN parameter information to be changed to the other devices through the mth (m<n) beacon to the n−1th beacon. Even though the coordinator decides to change the WVAN parameter, it does not apply the changed WVAN parameter as soon as it decides to change the WVAN parameter. In order that the device, which is transmitting data received through the original superframe duration, changes its configuration status in accordance with the superframe position, the coordinator previously transmits the WVAN parameter change information several times. Likewise, in order that the device, which is transmitting channel resources to the other device, controls data transmission through the changed channel resources according to the changed WVAN parameter, wherein the channel resources are allocated from the coordinator, the preparation time can be reduced.

Afterwards, the coordinator performs change of the WVAN parameter for the beacon position (S36), and transmits the beacon to the first device by applying the changed WVAN parameter (S37).

Hereinafter, an example of a data format for transmitting the beacon position change request message and its response message will be described with reference to FIG. 10 to FIG. 12.

The beacon position change request message and its response message are kinds of MAC commands and can be included in a MAC packet exchanged between the coordinator and the device. However, it is not limited that the beacon position change request message and its response message according to the embodiment of the present invention are included in the MAC packet. Namely, the beacon position change request message and its response message may be transmitted as another type data format.

Figure 10:
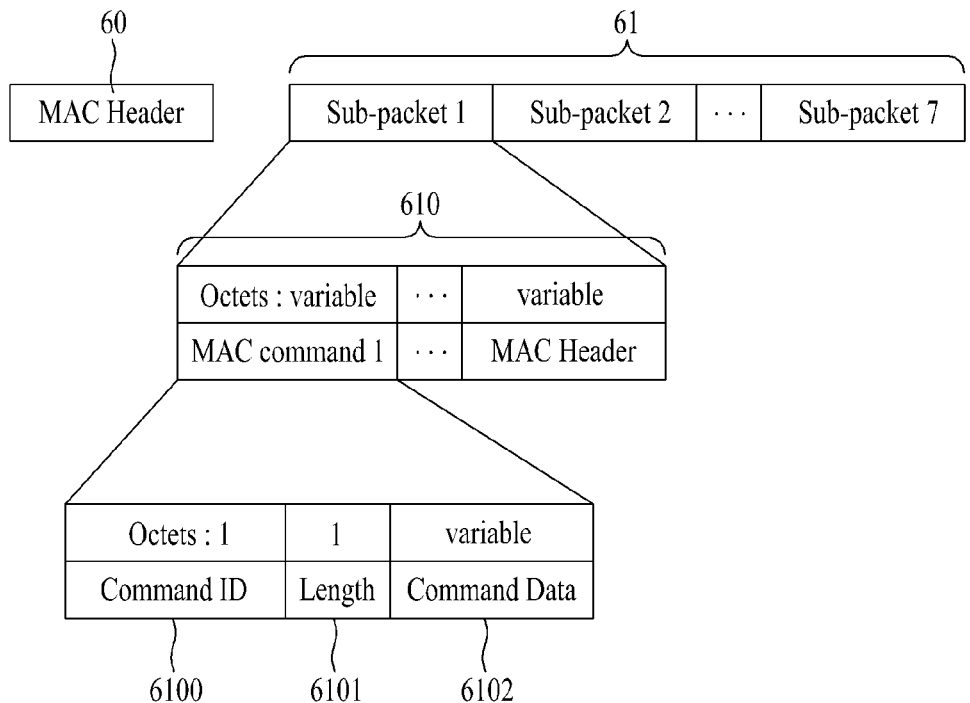
FIG. 10 is a diagram illustrating an example of a MAC packet transmitted and received from and to devices in a WVAN in accordance with one embodiment of the present invention.

FIG. 10 is a diagram illustrating an example of a MAC packet transmitted and received from and to devices in a WVAN in accordance with one embodiment of the present invention.

Referring to FIG. 10, a WVAN MAC packet includes a MAC header 60 and a packet body 61 having a plurality of sub-packets. Generally, the MAC packet can be used to refer to data packet. A region between the MAC header 60 and the first sub-packet is an HCS region that includes CRCs of 32 bits. The packet body 61 can include a minimum single sub-packet or maximum seven sub-packets, wherein the respective sub-packets may have various sizes. The MAC command is included in the packet body that includes sub-packets.

One sub-packet can include n number of MAC commands, and its data format includes an independent MAC command identification field 610 that can identify each of the MAC commands.

The MAC command identification field 610 can be segmented into a MAC command ID field 6100 for identifying a command type, a length field 6101 for identifying a length of MAC command, and a command data field 6102 for identifying command data.

The beacon position change request or the superframe duration change request according to the embodiment of the present invention can be performed through the MAC command ID field 6100 and the command data field 6102.

Generally, when transmitting data to a receiving device through channel resources allocated from the coordinator, a transmitting device uses a plurality of superframe used in the WVAN. As described with reference to FIG. 5, each superframe includes a beacon region where a beacon for identifying a beginning part of the superframe is transmitted, a reserved region where channel resources are allocated by the coordinator in accordance with a request of the device, and an unreserved region where data are transmitted and received in accordance with a contention mode between the devices. The coordinator periodically transmits the beacon for identifying the beginning of the superframe to the devices, wherein data transmission and reception is not performed between the devices in the period where the beacon is transmitted.

In other words, if the receiving device is displaying video data transmitted from the transmitting device and the coordinator transmits the beacon during the video data display procedure, transmission and display of the video data are stopped for the time corresponding to the period where the beacon is transmitted. Namely, buffering occurs during the data display procedure in the receiving device, and as the same procedure is repeated, the number of times of buffering and the time required for buffering are increased.

Accordingly, in the aforementioned embodiment, the receiving device can request the beacon position change for WVAN timing control to minimize the number of times of buffering and the time required for buffering according to the data display.

Figure 11:
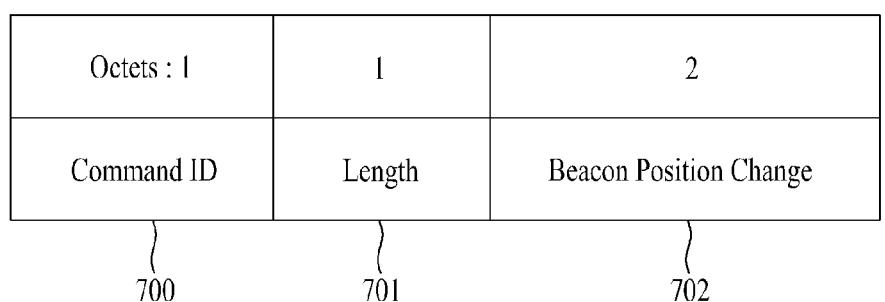
FIG. 11 is a diagram illustrating an example of a data format that includes a MAC command according to one embodiment of the present invention.

FIG. 11 is a diagram illustrating an example of a data format that includes a MAC command according to one embodiment of the present invention. Specifically, FIG. 11 illustrates an example of a data format transmitted from the device to the coordinator to request the beacon position change.

Referring to FIG. 11, the beacon position change request message transmitted as a kind of MAC commands includes a command ID field 700 for identifying a command type, a length field 701 for identifying a length of a message, and a beacon position change field 702 indicating a offset from a original beacon position to the a requested new beacon position. The beacon position change field 702 can include a beacon position change level, and data indicating a detailed command message commanded from the device to the coordinator, indicating whether the beacon transmission is performed prior to the beacon position change or delayed.

For example, an example of the beacon position change request message includes a beacon position change offset value using random data allocated to the beacon position change field 702. The beacon position change offset value represents a shift distance based on a specific beacon or the position to which the original beacon is transmitted. Since the superframe used by the device is basically time-divided based on the channel resources, a microsecond unit is used.

Also, the beacon position change offset value can represent whether the beacon transmission position changed using random data allocated to the beacon position change field 702 is prior to the original transmission position or delayed. For example, if 2 bytes (16 bits) are allocated, it is possible to request whether the beacon position changed through the fifteenth bit among the 16 bits is temporally prior to the original beacon transmission position or delayed. If the fifteenth bit is 0, it is requested that the beacon should be delayed temporally as compared with the original beacon transmission position. If the fifteenth bit is 1, it is requested that the beacon should be transmitted prior to the original beacon transmission position. At this time, the beacon position information set for the bit value of 0 may become contrary to the beacon position information set for the bit value of 1.

For another example, if the transmission position starting from the nth beacon is to be changed, the beacon position change field 702 can include data of the distance between the n−1th beacon and the nth beacon.

Also, the beacon position change field 702 can comprises more information indicating the expected transmission time that the beacon changed will be sent by the coordinator.

In addition, more detailed and various request messages can be included in the beacon position change field 702 in accordance with data allocated to the beacon position change field 702.

In this way, the coordinator which has received the beacon position change request message from the device transmits a response message to the beacon position change request message to the device.

FIG. 12 is a diagram illustrating another example of a data format that includes a MAC command according to one embodiment of the present invention.

Specifically, FIG. 12 relates to an example of a response message transmitted from the coordinator which has received the beacon position change request to the device in response to the beacon position change request. Also, a response message to a length change request message of a superframe duration which will be described later can also be configured in the same manner as the data format of FIG. 12.

Referring to FIG. 12, the response message format of the beacon position change can include a MAC command ID field 800 for identifying a command type, a length field 801 for identifying a length of MAC command, and a field 802 for identifying command contents.

The field 802 for identifying command contents can include information indicating whether the coordinator accepts the beacon position change request of the device and indicating a reason code if the coordinator rejects the beacon position change request. Table 1 illustrates an example of a response message according to the reason code identified in the field 802.

TABLE 1

| Valid Value of Reason Code | Response Message |
|---|---|
| 0 | Success |
| 1 | Unsupported Feature |
| 2 | Already synchronized with higher priority stream |
| 3 | WVAN shutdown in progress |
| 4 | Channel change in progress |
| 5 | Coordinator handover in progress |
| 6-254 | Reserved |
| 255 | Other failure |

Referring to Table 1, if the reason code has a value of 0, it indicates an acknowledgement response that the coordinator will change the beacon position in accordance with the request of the device. If the reason code does not have a value of 0, it indicates that the coordinator rejects the request of the device and also indicates the reject reason in accordance with the value of the reason code.

Whether the beacon position change can be performed in accordance with the request of the device may depend on performance of the coordinator. If the value of the reason code is 1, it indicates that the beacon position change in the corresponding coordinator is not supported. Also, since the coordinator transmits the beacon to the one or more devices belonging to the WVAN, it can synchronize a beacon transmission period for higher priority data streams, wherein the data streams are being output from either a device, which has transmitted the request message, or another device.

If the value of the reason code is 2, it indicates that the coordinator rejects the request message by synchronizing other higher priority data streams. For example, the coordinator can receive the request message from the one or more devices of the WVAN. In this case, the coordinator determines higher priority data streams based on resolution and decides to change the WVAN parameter in accordance with a request of the device that displays the corresponding data streams, whereas the coordinator transmits a response message to the other devices, wherein the response message includes reason code 2.

If the value of the reason code is 3, it indicates that the WVAN is being shut down. Shutdown of the WVAN can be performed by the coordinator only. The coordinator performs shutdown of the WVAN in accordance with the request of a MAC upper layer. If the value of the reason code is 4, it indicates that the coordinator is performing channel change. If the value of the reason code is 5, it indicates that handover from the current coordinator to another coordinator is being performed. If the value of the reason code is 6-254, a reserved region is not used. If the value of the reason code is 255, it indicates other failure reason of other beacon position change request.

Each reason code listed in Table 1 above is an example of a response type that can be expressed by the response message to the beacon position change request. The response message type set to each reason code value can be varied, and can be implemented in more detailed and various manners in accordance with data allocated to the reason code.

If the coordinator transmits an response message (reason code 1) by deciding to follow the beacon position change request of the device, the device broadcasts the beacon as much as the number of times previously set, wherein the beacon includes change information of the WVAN parameter of the beacon position.

FIG. 13 is a diagram illustrating an example of a data packet that includes WVAN configuration information in accordance with one embodiment of the present invention. Specifically, FIG. 13 illustrates information of changed WVAN parameter.

Referring to FIG. 13, an example of a data packet that includes a WVAN parameter change information element includes an IE index field 900 for a use of IE indicating data for providing WVAN parameter change information, a length field 901 indicating a length of a data format, a change type field 902 indicating a type of a parameter to be changed, a change beacon number field 903 indicating a first beacon number to which the changed WVAN parameter is applied, and a WVAN parameter field 904 indicating a WVAN parameter.

The change type field 902 can represent a desired one to be changed among the WVAN parameters using various values. For example, if 1 octet (8 bits) is allocated to the parameter type identification field 502, the WVAN parameters can be represented as illustrated in Table 2.

TABLE 2

| Change Type Value | WVAN Parameter |
| --- | --- |
| 0x00 | WVNID |
| 0x01 | Beacon Position |
| 0x02 | Superframe duration |
| 0x03 | Channel Index |
| 0x04-0xFF | Reserved |

As illustrated in Table 2, the changed WVAN parameter can be indicated in accordance with a data value corresponding to the parameter type identification field 902. Its details can be represented in the WVAN parameter field 904.

If the value of the change type field 902 is 0x00, it indicates change of a WVNID parameter. The WVNID parameter can be changed if the coordinator searches another WVAN having the same WVNID on different channels. If the WVNID parameter is changed, it indicates information indicating new WVNID through at least one bit of the WVAN parameter field 904.

If the value of the change type field 902 is 0x01, it indicates change of a beacon position parameter. The beacon position parameter can be changed if the coordinator desires to shift a relative position of the beacon on the time axis. At this time, information of new beacon position is included in the WVAN parameter field 904. For example, the WVAN parameter field 904 can include changed beacon transmission position information depending on commands commanded from the device to the coordinator as described in FIG. 11, wherein the commands include a beacon position change level and information as to whether beacon transmission is prior to change or delayed.

If the value of the change type field 902 is 0x02, it indicates change of a superframe duration parameter. The superframe duration parameter can be changed depending on the number of devices belonging to the WVAN and traffic load. If the superframe duration parameter is changed, detailed information of the changed superframe duration length is included in the WVAN parameter field 904.

If the value of the change type field 902 is 0x02, it indicates change of a channel index parameter. The channel index parameter can be changed if at least one of the HAP channel and the LRP channel which are being used is intended to be changed to other channel due to serious interference occurring between a random device or coordinator and other WVAN. For channel change, the coordinator requests the devices belonging to the same WVAN as that to which the coordinator belongs to perform channel estimation and channel search and performs channel change based on the request. During channel change, the WVAN parameter field 904 is used to indicate the changed HRP and LRP channel index information.

The beacon number field 903 indicates a beacon number for identifying a beginning part of a superframe to which the changed WVAN parameter is applied. Namely, since each superframe is identified by the beacon transmitted from the coordinator, the devices use a wireless network to which the WVAN parameter is applied, in accordance with transmission of the nth beacon represented in the beacon number field 903.

Hereinafter, examples of a change request of a beacon position parameter of WVAN parameters in accordance with the embodiment of the present invention will be described with reference to FIG. 14 to FIG. 16.

For example, if the receiving device belonging to the WVAN is displaying video data among data received from the transmitting device, the method illustrated in FIG. 14 can be used.

FIG. 14 is a diagram illustrating an example of a video data display procedure according to one embodiment of the present invention. In FIG. 14, an example of a method of playing uncompressed video streams includes a method of scanning video data onto a display screen using an electron beam.

Referring to (a) of FIG. 14, video data are sequentially scanned from a right upper part of the display screen to a left bottom part of the display screen. If the video data are scanned to reach the lowest part, scanning returns to the uppermost part. As this electron beam scanning on the display screen is vertically repeated, a video screen is played. At this time, the scanning interval of the video data from the uppermost part to the lowest part of the screen will be referred to as an active video area. The time interval required to return to the uppermost part after scanning of the video data to the lowest part of the display screen will be referred to as a blanking interval or a vertical blanking interval.

In (b) of FIG. 14, for convenience of description, a video data display procedure (a) performed vertically is arranged on a horizontal plane, and a video data display interval where the video data are output on a display is obtained by repetition of the active video area and the blanking interval.

Accordingly, the interval where the video data are output on the display may be affected by WVAN timing.

Hereinafter, in FIG. 15 and FIG. 16, it is assumed that a superframe duration length is consistent with a length of the video data display interval before the device requests the coordinator to perform change of the beacon position.

Figure 15:
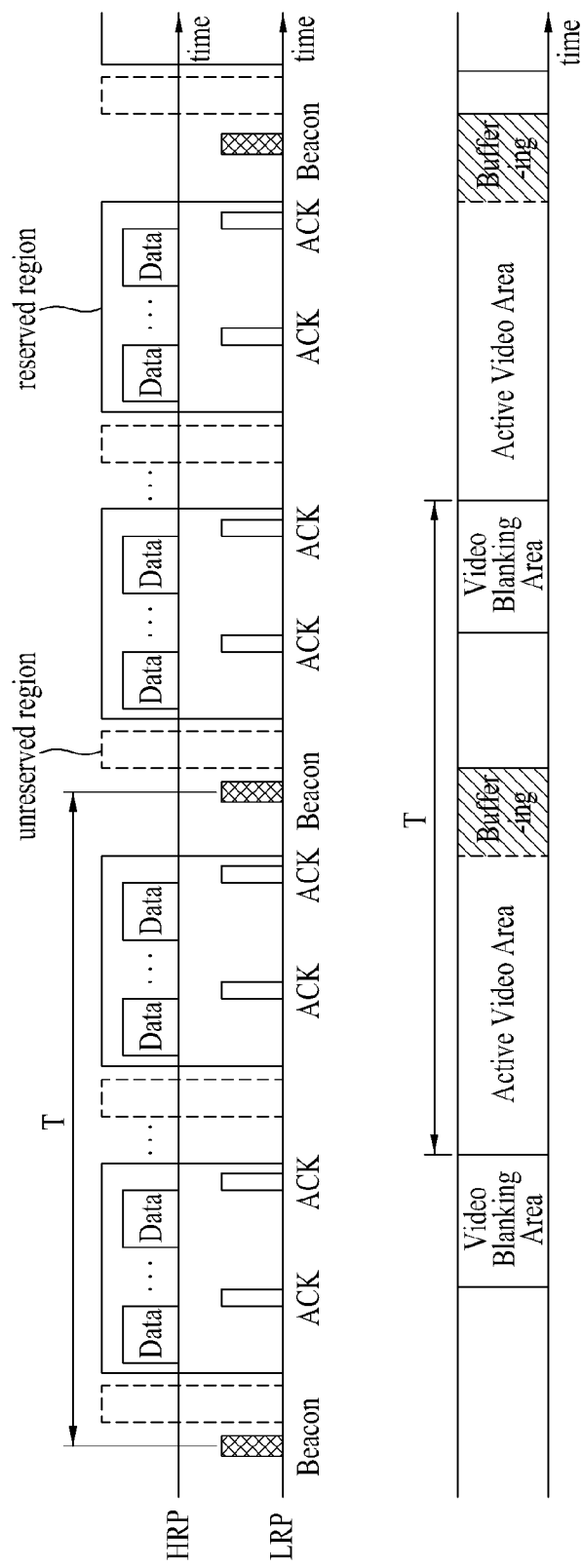
FIG. 15 is a diagram illustrating an example of a video data output procedure in a WVAN device according to one embodiment of the present invention.

FIG. 15 is a diagram illustrating an example of a video data display procedure in a WVAN device according to one embodiment of the present invention.

Referring to FIG. 15, a video data display interval for outputting video data among data received from the transmitting device to the receiving device is obtained by repetition of the active video area and the blanking interval. At this time, if the coordinator transmits the beacon in the active video area, the transmitting device cannot transmit data to the receiving device for the time corresponding to a receiving duration of the beacon, whereby data transmission is stopped. Accordingly, the time required for buffering occurring during the video data display procedure and the number of times of buffering increase in the receiving device.

Generally, the active video area and the blanking interval together constitute one video data display interval. In this case, the video data display interval is defined to have a given period. Also, since a beacon transmission period is controlled by the coordinator, the beacon transmission period is maintained regularly. Accordingly, if a buffer transmission interval is included in the active video area, the same procedure is repeated, and buffer size increases in accordance with the lapse of time.

In this respect, in order to minimize the buffer size occurring during the video data output procedure, the receiving device can designate the change position of the beacon and request the coordinator to transmit the beacon for the blanking interval. Since the video screen is not display for the blanking interval even though the video data are transmitted for the blanking interval, the video data are used to transmit time code, closed caption, text multiplex broadcasting or other digital data.

Figure 16:
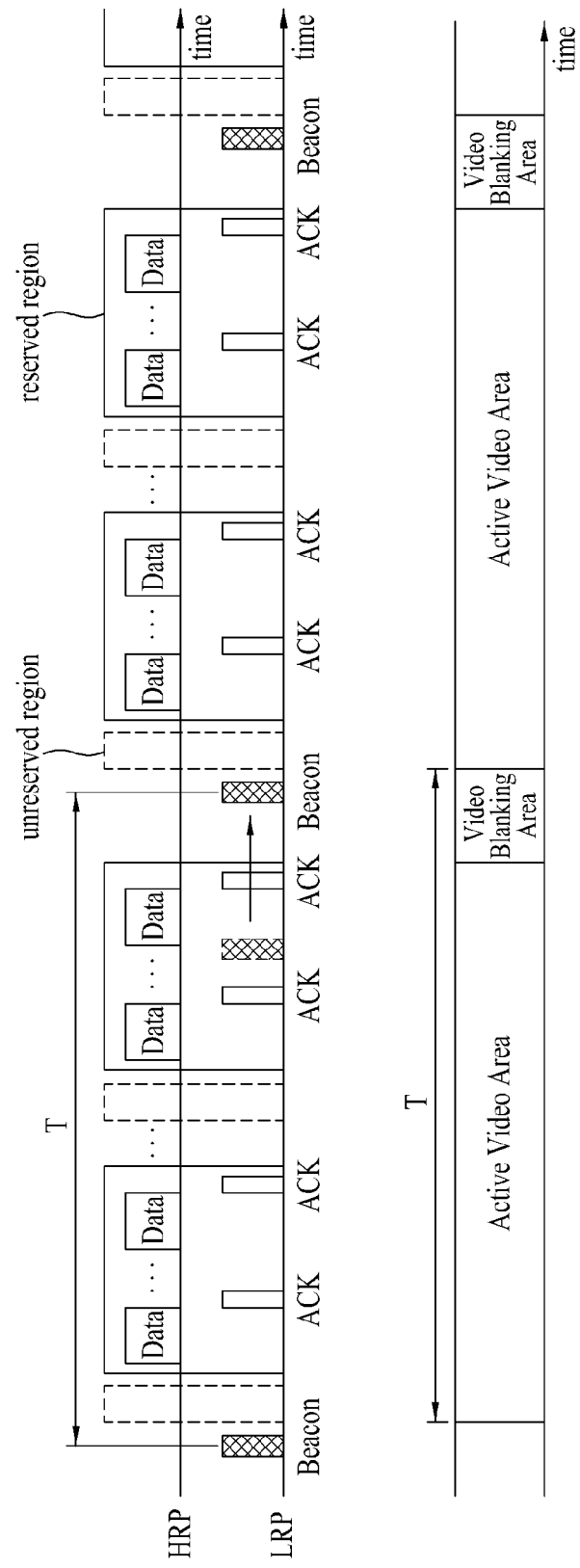
FIG. 16 is a diagram illustrating another example of a video data output procedure in a WVAN device according to one embodiment of the present invention.

If the coordinator transmits the beacon by changing the beacon position on the time axis in accordance with the request of the device, the beacon can be synchronized with the blanking interval as illustrated in FIG. 16.

FIG. 16 is a diagram illustrating another example of a video data display procedure in a WVAN device according to one embodiment of the present invention.

Referring to FIG. 16, if the coordinator changes the beacon position by synchronizing the beacon transmission interval with the blanking interval in accordance with the request of the receiving device, the beacon transmission interval is synchronized with the blanking interval. Under the assumption that there is no other data loss or transmission break reason, the receiving device can continuously receive data from the transmitting device for the active video area through synchronization of the beacon and the blanking interval. Accordingly, it is possible to gradually reduce buffer size in accordance with the lapse of time while reducing the number of times of buffering occurring in the active video area.

As described above, synchronization of the beacon transmission interval and the blanking interval through the beacon position control according to the embodiment of the present invention can be used when the superframe duration length is identical with the length of the video data display interval including the active video area and the blanking interval. If the superframe duration length is not identical with the length of the video data display interval, the beacon transmission interval may not be synchronized with the blanking interval again during a video data display operation which will be performed later.

Accordingly, for WVAN timing control, the device according to the embodiment of the present invention can request the coordinator to change a WVAN parameter of the superframe duration length.

FIG. 17 is a flow chart illustrating another example of a procedure of exchanging messages for WVAN parameter change in accordance with one embodiment of the present invention. In FIG. 17, for WVAN timing control, the device requests the coordinator to change the WVAN parameter of the superframe duration.

Referring to FIG. 17, as the WVAN starts, the coordinator periodically transmits the beacon one or more devices belonging to the WVAN (S40). The first device of the one or more devices transmits a superframe duration change request message to the coordinator in accordance with its status (S41). The coordinator determines whether to reduce or extend the superframe duration in accordance with the request of the first device (S42). And, the coordinator transmits a superframe duration change response message to the first device, wherein the superframe duration change response message includes the result determined for the superframe duration (S43).

If the coordinator decides to change a superframe duration range in accordance with the request of the first device, it transmits information of the changed WVAN parameter to the first device and other devices through the beacon as much as the number of times previously set (S44 and S45). The WVAN parameter change information can be transmitted through the data format illustrated in FIG. 3. Namely, the superframe duration change information requested from the device is included in the change type field 902 indicating a type of the changed WVAN parameter and the field 904 indicating the WVAN parameter.

Afterwards, the coordinator performs change of the WVAN parameter for the superframe duration (S46), and transmits the beacon to the first device by applying the changed WVAN parameter (S47).

The superframe duration change request message and its response message are also kinds of MAC commands, and can be included in the MAC packet exchanged between the coordinator and the device.

FIG. 18 is a diagram illustrating other example of a MAC command format according to one embodiment of the present invention. Specifically, FIG. 18 illustrates an example of a MAC command transmitted from the device to the coordinator to request change of the superframe duration length.

Referring to FIG. 18, the superframe duration change request message transmitted in a type of a MAC command includes a command ID field 1000 for identifying a command type as described in FIG. 10, a length field 1001 for identifying a length of a message, and a superframe duration change field 1002 indicating superframe duration change request. For example, the superframe duration change field 1002 can include data specifying a new superframe length to be requested by the device. Basically, the superframe is an interval that includes CTBs of channel resources allocated from the coordinator to the coordinator and is based on the time axis. Accordingly, the device can request the coordinator of superframe duration of a new length within 0 to 65535 microsends. For another example, the superframe duration change field 1002 can include request information of an increase or decrease level based on the original superframe duration length.

As described above, the superframe duration change request can include change of the superframe duration length for synchronization of the beacon transmission interval and the blanking interval. Also, a random device belonging to the WVAN can transmit a superframe duration length change request message to the coordinator in accordance with traffic load.

An example of a response message transmitted from the coordinator in response to the superframe duration length change request message is identical with the data format described with reference to FIG. 12. Namely, the data format that includes the response message includes a command ID field 800 indicating a command type, a length field 801 indicating a length of a MAC command, and a field 802 indicating command contents. The field 802 can include information indicating whether the coordinator accepts the request of the device and a reason code of a reject reason if the coordinator rejects the request. Since the response message depending on a value of the reason code has been described with reference to Table 1, the same description will be omitted for briefness of the description.

Hereinafter, examples of the superframe duration length change request among the WVAN parameters according to the embodiment of the present invention will be described with reference to FIG. 19 and FIG. 20. In FIG. 10 and FIG. 20, before the device requests the coordinator to change the superframe duration, it is assumed that the beacon transmission interval is synchronized with the blanking interval.

Figure 19:
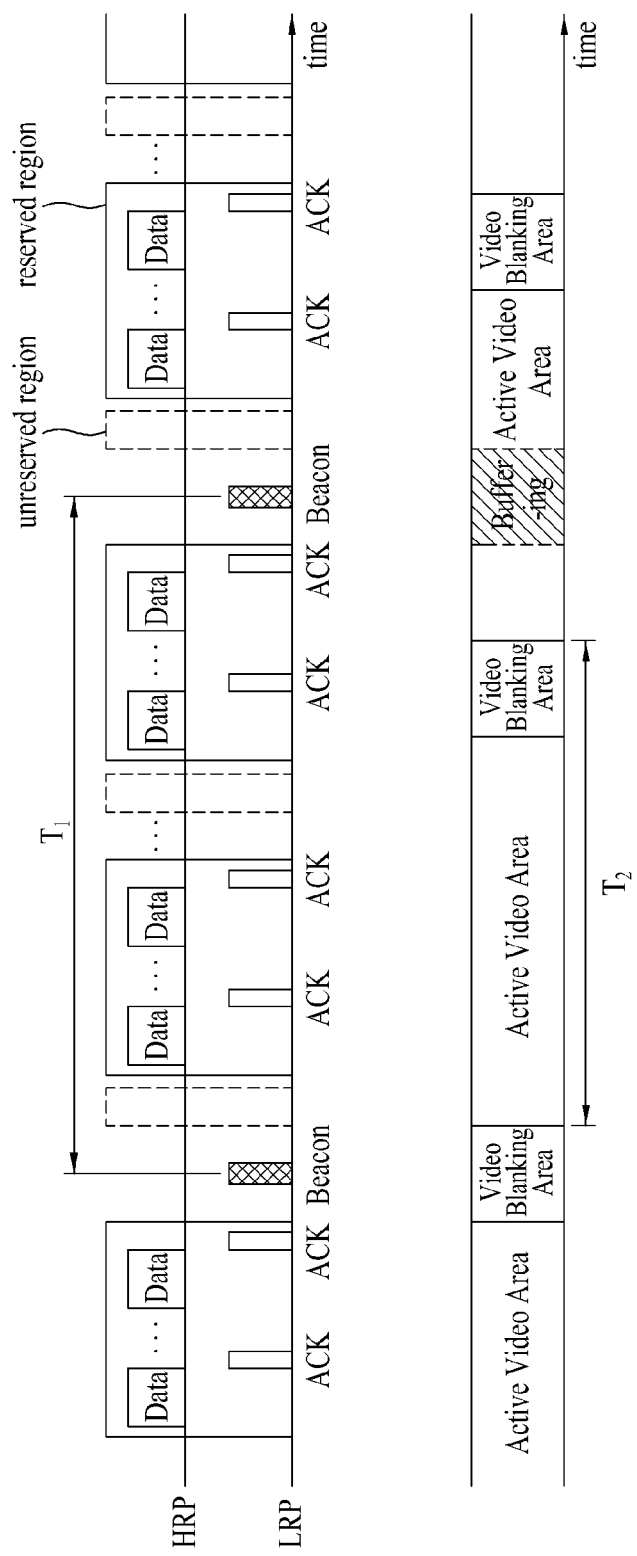
FIG. 19 is a diagram illustrating still another example of a video data output procedure in a WVAN device according to one embodiment of the present invention.
Figure 20:
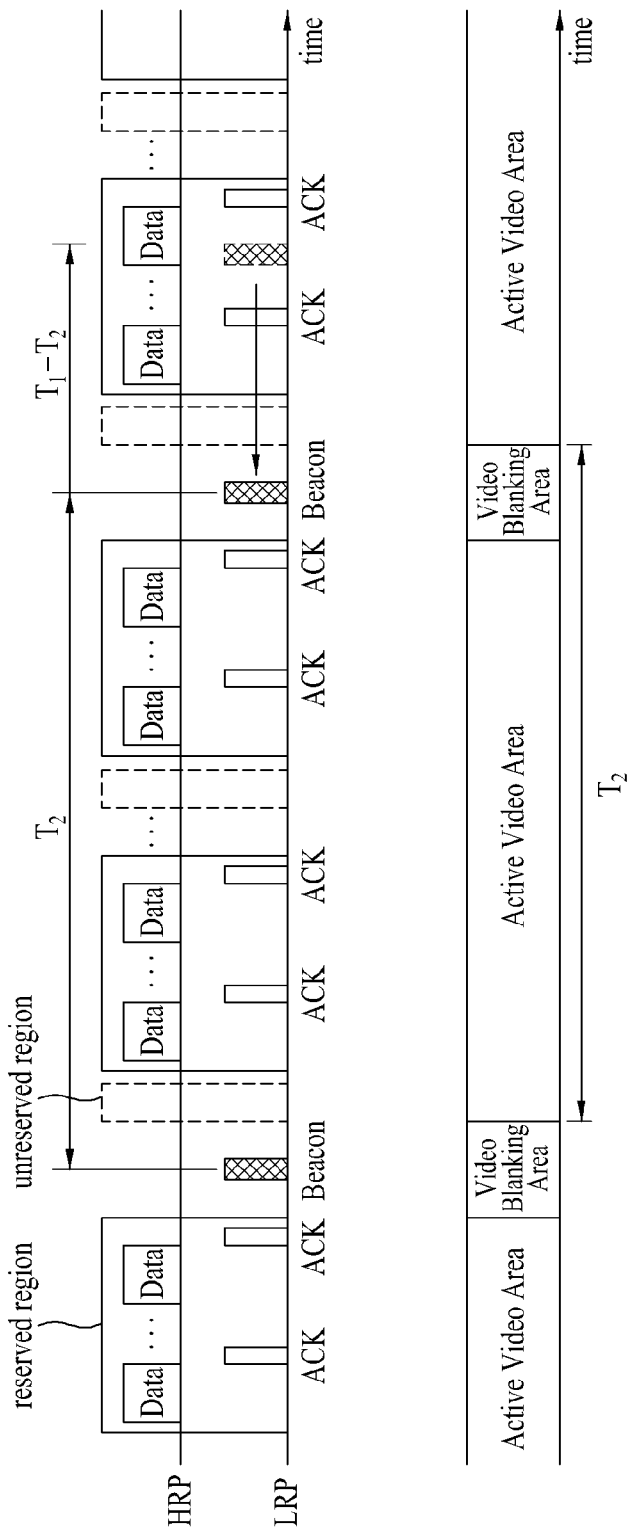
FIG. 20 is a diagram illustrating further still another example of a video data output procedure in a WVAN device according to one embodiment of the present invention.

FIG. 19 is a diagram illustrating another example of a video data output procedure in a WVAN device according to one embodiment of the present invention.

Referring to FIG. 19, as an example of a method of displaying uncompressed video data of data received from the transmitting device, if the receiving device scans video data to the display screen using an electron beam, a video data display interval is obtained by repetition of the active video area and the blanking interval.

Even though the beacon transmission interval of the beacon is synchronized with the blanking interval, if the superframe duration length is not synchronized with the length of the video data display interval, the beacon transmission interval fails to be synchronized with the blanking interval in accordance with the lapse of time and is included in the active video area. Since the transmitting device stops data transmission for the beacon transmission interval, buffering occurs in the active video area. As this procedure is repeated, buffer size increases gradually.

Accordingly, in order to minimize the buffer size as the beacon transmission interval is synchronized with the blanking interval, the device according to the embodiment of the present invention can request the coordinator to change the superframe duration to synchronize the superframe duration length with the length of the video data display interval.

FIG. 20 is a diagram illustrating further still another example of a video data display procedure in a WVAN device according to one embodiment of the present invention. Specifically, FIG. 20 illustrates an example that the receiving device transmits a WVAN parameter change request message by designating the superframe duration length to change the superframe duration length in accordance with the length of the video data display interval and the coordinator changes the superframe duration length in accordance with the WVAN parameter change request message.

In a state that the beacon transmission interval of the coordinator is synchronized with the blanking interval, if the superframe duration length is synchronized with the length of the video data display interval, the beacon periodically transmitted from the coordinator can be transmitted within the blanking interval. Accordingly, the device according to the embodiment of the present invention can gradually reduce buffer size in accordance with the lapse of time while reducing the number of times of buffering occurring in the active video area.

Unlike the aforementioned embodiment, for WVAN timing control, the device may transmit a message for requesting change of the beacon position and the superframe duration length to the coordinator.

Figure 21:
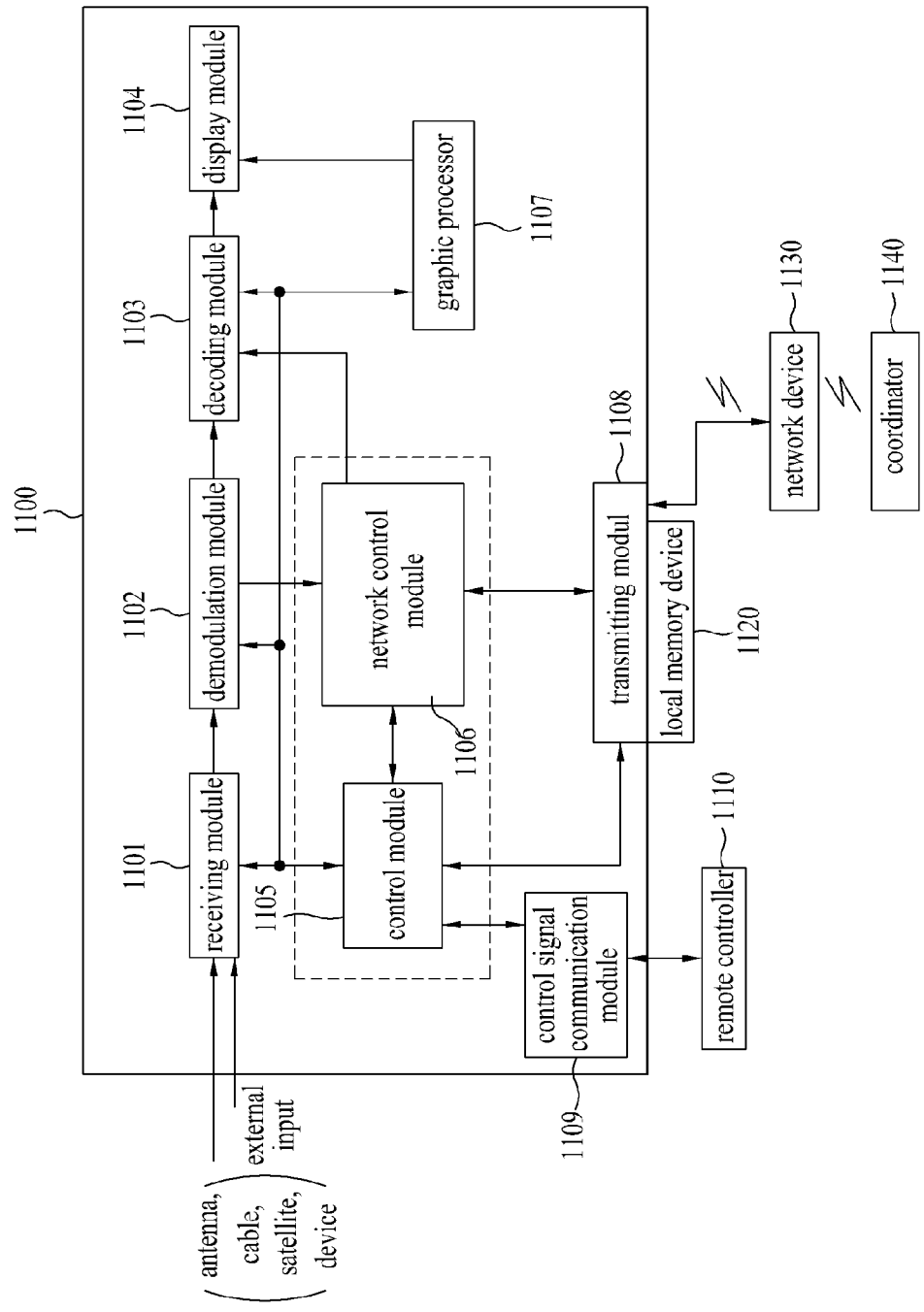
FIG. 21 is a diagram illustrating an example of a broadcasting signal processing system that includes a WVAN device according to one embodiment of the present invention.

FIG. 21 is a diagram illustrating an example of a broadcasting signal processing system that includes a WVAN device according to one embodiment of the present invention.

The WVAN device can play A/V data through processes which will be described layer, wherein the A/V data are input from at least one of a broadcasting station, cable, satellite, and other WVAN device through an antenna. If the WVAN device receives data from other device, it could be a receiving device. If the WVAN device transmits data to other device, it could be a transmitting device. Also, the WVAN device can perform message exchange with the coordinator.

Referring to FIG. 21, the broadcasting signal processing system that includes the WVAN device according to the embodiment of the present invention includes a receiving device 1100, a remote controller 1110, a local memory device 1120, and a network device 1130 for performing wireless communication with a receiving device 1240.

The transmitting device 1100 that transmits A/V data includes a receiving module 1101, a demodulation module 1102, a decoding module 1103, a display module 1104, a control module 1105, a channel resource control module 1106, a graphic processor 1107, a transmitting module 1108, and a control signal communication module 1109. In the example of FIG. 19, the transmitting device further includes a local memory device 1120 directly connected with the transmitting module 1108 that includes input and output ports. However, the local memory device may be a memory device mounted in the transmitting device 1110.

The transmitting module 1108 can communicate with the wire/wireless network device 1130, and can be connected with at least one receiving device 1140 through the network device 1130, wherein the at least one second device 1140 exists on the wireless network. The control signal communication module 1109 receives a user control signal in accordance with a user control device, for example, remote controller, and outputs the received signal to the control module 1105.

The receiving module 1101 could be a tuner that receives a broadcasting signal of a specific frequency through at least one of ground wave, satellite, cable, and Internet network. The receiving module 1101 may be provided respectively for each of broadcasting sources, for example, ground wave broadcasting, cable broadcasting, satellite broadcasting, and personal broadcasting. Alternatively, the receiving module 1101 may be a unified tuner. Also, supposing that the receiving module 1101 is a tuner for ground wave broadcasting, at least one digital tuner and at least one analog tuner may be provided respectively, or a digital/analog tuner may be provided.

Furthermore, the receiving module 1101 may receive internet protocol (IP) streams transferred through wire and wireless communication. If the receiving module 1101 receives IP streams, the receiving module 1101 can process transmitting and receiving packets in accordance with an IP protocol that establishes source and destination information for received IP packets and packets transmitted from the receiver. The receiving module 1101 can output video/audio/data streams included in the received IP packets in accordance with the IP protocol, and can generate transport streams to be transmitted to the network as IP packets in accordance with the IP protocol so as to output them. The receiving module 1101 is an element that receives an externally input video signal, and, for example, may receive IEEE 1394 type video/audio signals or HDMI type streams from the outside.

According to the embodiment of the present invention, if the transmitting device transmits channel time extension information to the receiving device, it can receive a response message to the channel time extension information from the receiving device through the receiving module 1101.

The demodulation module 1102 demodulates broadcasting signals among data input through the receiving module 1101 or broadcasting signals transmitted from the receiving device in an inverse order of a modulation mode. The demodulation module 1102 outputs broadcasting streams by demodulating the broadcasting signals. If the receiving module 1101 receives stream type signals, for example, IP streams, the IP streams are output to the decoding module 1103 after bypassing the demodulation module 1102.

The decoding module 1103 includes an audio decoder and a video decoder, and decodes the broadcasting streams output from the demodulation module 1102 through a decoding algorithm and outputs the decoded streams to the display module 1104. At this time, a demultiplexer (not shown) that splits each stream in accordance with a corresponding identifier may additionally be provided between the demodulation module 1102 and the decoding module 1103. The demultiplxer splits the broadcasting signals into an audio element stream (ES) and a video element stream and outputs them to each decoder of the decoding module 1103. Also, if a plurality of programs are multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The display module 1104 displays broadcasting contents received from the receiving module 1101 and contents stored in the local memory device 1120. The display module 1104 can display a menu indicating whether the memory device has been mounted in the transmitting device and information related to the remaining capacity of the memory device, in accordance with a control command of the control module 1105, and can be operated under the control of the user.

The control module 1105 can control the operations of the aforementioned modules (receiving module, demodulation module, decoding module, display module, graphic processor, network control module, and interface module). Also, the control module 1105 displays a menu that receives a control command of the user, and drives an application that displays various kinds of information or menu of the broadcasting signal processing system for the user.

For example, the control module 1105 can read out the contents stored in the local memory device 1120 if the local memory device 1120 is mounted in the transmitting device. Also, the control module 1105 can control the operation of the local memory device 1120 so that the broadcasting contents received from the receiving module 1101 are stored in the local memory device 1120 if the local memory device 1120 is mounted in the transmitting device. Furthermore, the control module 1105 can output a control signal for mounting the local memory device 1120 depending on whether the local memory device 1120 has been mounted in the transmitting device.

The control module 1105 checks remaining memory capacity of the local memory device 1120, and allows information of the remaining memory capacity to be displayed for the user on the display module 1104 through the graphic processor 1107. The control module 1105 can shift the contents stored in the local memory device 1120 to the remote memory device if the remaining memory capacity of the local memory device 1120 is not sufficient. In this case, the control module 1105 can display a menu indicating whether to shift the contents stored in the local memory device 1120 to another local memory device (not shown) or the remote memory device through the display module 1104. And, the control module 1105 can receive and process a user control signal of the menu. Accordingly, the control module 1105 can allow the contents stored in the local memory device 1120 and other directly or remotely mounted memory device to be shifted between them and stored therein.

The network control module 1106 may directly receive the broadcasting signals from the receiving module 1101, or may receive the broadcasting signals demodulated by the demodulation module 1102. In case of the former case, an encoding process may be omitted. Also, the broadcasting signals received by the receiving module 1101 can be input to the network control module 1106 after going through a processing procedure for signal transmission in the control module 1105. For example, if a message including the broadcasting signals is received from the transmitting device, the received message is split into a broadcasting signal and MAC message by the network control module 1106. The split broadcasting signal (or broadcasting stream) is input to the decoding module 1103, decoded by a decoding algorithm, and output to the display module 1104.

The network control module 1106 includes a module operated to allow the broadcasting signal receiver 1100 belonging to the WVAN to control a WVAN configuration parameter. Although the device not the coordinator cannot directly change the WVAN parameter, the broadcasting signal receiver 1100 according to the embodiment of the present invention can transmit a MAC command requesting change of the WVAN parameter to the coordinator 1140 in accordance with its operation status. The network control module 1106 determines a desired parameter to be changed among the WVAN parameters, generates a change request message, and transmits the generated change request message to the coordinator through the network device 1130.

For example, like the aforementioned embodiment, if video data received by the broadcasting signal receiver 1100 are output from the display module 1104, the network control module 1106 can generate a change request message of at least one of a beacon position and a superframe duration length for WVAN timing control, thereby minimizing a size of buffering occurring during an output procedure. Namely, the network control module 1106 is a second controller that manages and controls the device communication module illustrated in FIG. 7 to generate a WVAN parameter change request message that is a kind of a MAC command. Also, the network control module 1106 can determine a response message to the WVAN parameter change request message received from the coordinator through the receiving module 1101.

If the broadcasting signal receiver 1100 illustrated in FIG. 21 is a device that performs a function of the coordinator in the WVAN, the network control module 1106 can directly mange and control the WVAN and control change of the WVAN parameter.

For example, if the broadcasting signal receiver 1100 is a coordinator according to the embodiment of the present invention, it can receive the WVAN parameter change request message from the WVAN device through the receiving module 1101, and the received message is transferred to the network control module 1106. The network control module 1106 determines whether to change a parameter of channel resources, which will be allocated, in accordance with the WVAN parameter change directions included in the request message, and generates a response message to the determined result. Also, the generated response message can be controlled to be transmitted to the device which has transmitted the WVAN parameter change request message through the transmitting module 1108.

Meanwhile, a control mode of the network control module 1106 can be performed by the control module 1105. For convenience of description, although the control module 1105 and the network control module 1106 are provided separately in FIG. 21, these control modules can be implemented by one system chip as illustrated in a dotted line.

The graphic processor 1107 processes a graphic to be displayed so that a menu screen is displayed in a video image displayed by the display module 1104, and controls the graphic to be displayed in the display module 1104 together with the menu screen.

The transmitting module 1108 can be used to transmit the MAC command generated by the network control module 1106 to the coordinator 1140 through the wire and wireless network, or transmit data from the broadcasting signal receiver 1100 to another device.

Also, the transmitting module 1108 can include an interface module to perform bidirectional communication between the devices belonging to the WVAN. The interface module can be interfaced with at least one second device 1140 through the wire and wireless network. Examples of the interface module include Ethernet module, Bluetooth module, short distance wireless Internet module, portable Internet module, home PNA module, IEEE1394 module, PLC module, home RF module, and IrDA module.

The terms herein can be replaced with other terms. For example, "device" can be replaced with user device (or machine), station, etc., and "coordinator" can be replaced with coordinating (control) device, coordinating (or control) station, piconet coordinator (PNC), etc. Also, the WVAN parameter configuring the WVAN can be used to refer to the network configuration information.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of exchanging messages at a coordinator in a wireless network, the method comprising:
   receiving a change request message for requesting a change of a superframe duration length among configuration parameters of the wireless network from a device associated with the wireless network;
   transmitting a response message to the device in response to the request message, wherein the response message comprises a command ID field comprising a unique number that identifies the response message, a length field indicating a length of the response message, and a reason code field comprising a reason code; and
   transmitting a plurality of beacons to the device when the reason code field comprises the reason code of "SUCCESS", wherein each of the plurality of beacons comprises a parameter change information element (IE) including a changed superframe duration length and a change beacon number field comprising a beacon number of a superframe when the change of the superframe duration takes effect,
   wherein the superframe duration length comprises the length of a superframe for channel resources allocated from the coordinator to another device, and
   wherein the parameter change IE comprises an IE index field comprising a unique number that identifies the parameter change IE, a change type field indicating a type of the parameter to be changed, and a network parameter field comprising information about a changed value of the parameter.

2. The method of claim 1, wherein the request message comprises a command ID field comprising a unique number that identifies the request message, a length field indicating a length of the request message, and a superframe duration field indicating a requested superframe duration length.

3. The method of claim 1, wherein the information about the changed value of the parameter is a new superframe duration length.

4. The method of claim 1, wherein a last beacon among the plurality of beacons is broadcasted by the coordinator prior to a broadcast of a beacon corresponding to the beacon number.

5. The method of claim 1, further comprising transmitting, to the device, a beacon to which the changed superframe duration length is applied.

6. The method of claim 1, wherein the reason code field comprises a reason for failure when the change of the superframe duration length is not possible.

7. The method of claim 1, wherein the change request message and the response message are included in a media access control (MAC) packet.

8. The method of claim 6, wherein the reason for failure is one of "Unsupported Feature", "Already synchronized with higher priority stream", "Network shutdown in progress", "Channel change in progress", "Coordinator handover in progress" and "Other failure".

9. A coordinator of a wireless network comprising:

a transmitting module;

a receiving module configured to receive a change request message for requesting a change of a superframe duration length among configuration parameters of the wireless network from a device of the wireless network; and a control module configured to generate a response message in response to the request message and to transmit the response message to the device via the transmitting module, wherein the response message comprises a command ID field comprising a unique number that identifies the response message, a length field indicating a length of the response message, and a reason code field comprising a reason code, wherein the control module is further configured to transmit a plurality of beacons to the device when the reason code field comprises the reason code of "SUCCESS", wherein each of the plurality of beacons comprises a parameter change information element (IE) including a changed superframe duration length and a change beacon number field comprising a beacon number of a superframe when the change of the superframe duration takes effect, wherein the superframe duration length comprises the length of a superframe for channel resources allocated from the coordinator to another device, and wherein the parameter change IE comprises a IE index field comprising a unique number that identifies the parameter change IE, a change type field indicating a type of the parameter to be changed, and a network parameter field comprising information about a changed value of the parameter.

10. The coordinator of claim 9, wherein the control module transmits a beacon, via the transmitting module, to the device to which the changed superframe duration length is applied.

* * * * *